United States Patent
Hess et al.

(10) Patent No.: US 7,067,935 B2
(45) Date of Patent: Jun. 27, 2006

(54) METHOD FOR REGULATING THE LEVEL OF A DAM INSTALLATION AND DAM INSTALLATION IMPLEMENTING THE METHOD

(75) Inventors: Günther Hess, Linz (AT); Heinz Panholzer, Altenberg (AT)

(73) Assignee: VA Tech Hydro GmbH & Co., Vienna (AT)

( * ) Notice: Subject to any disclaimer, the term of this patent is extended or adjusted under 35 U.S.C. 154(b) by 0 days.

(21) Appl. No.: 10/862,431

(22) Filed: Jun. 8, 2004

(65) Prior Publication Data
US 2004/0247393 A1    Dec. 9, 2004

Related U.S. Application Data

(63) Continuation of application No. PCT/EP02/13278, filed on Nov. 26, 2002.

(30) Foreign Application Priority Data
Dec. 20, 2001   (AT)   ............................. A 2001/2001

(51) Int. Cl.
    *H02P 9/04*      (2006.01)
    *F03B 17/00*     (2006.01)
    *F03B 13/10*     (2006.01)
    *F03B 13/00*     (2006.01)
    *H02J 3/00*      (2006.01)

(52) U.S. Cl. ............................. 290/43; 290/52; 290/54; 405/75

(58) Field of Classification Search ................. 290/43, 290/52, 54; 405/75
See application file for complete search history.

(56) References Cited

U.S. PATENT DOCUMENTS

| | | | | |
|---|---|---|---|---|
| 3,537,111 A | * | 11/1970 | Whitten, Jr. .................... | 4/508 |
| 4,109,160 A | | 8/1978 | Goto et al. .................... | 290/52 |
| 4,245,163 A | * | 1/1981 | Philippe ....................... | 290/52 |
| 4,332,507 A | * | 6/1982 | Wakamori et al. ............. | 405/92 |
| 4,380,419 A | * | 4/1983 | Morton ......................... | 417/334 |
| 4,426,846 A | * | 1/1984 | Bailey .......................... | 60/398 |
| 4,443,707 A | * | 4/1984 | Scieri et al. ................. | 290/4 R |
| 4,467,216 A | | 8/1984 | Murphy ......................... | 290/43 |
| 4,607,399 A | * | 8/1986 | Yovanofski .................... | 4/508 |
| 4,621,657 A | * | 11/1986 | St. Ledger .................... | 137/426 |

(Continued)

FOREIGN PATENT DOCUMENTS

CH             636736         6/1983

(Continued)

*Primary Examiner*—Darren Schuberg
*Assistant Examiner*—Pedro J. Cuevas
(74) *Attorney, Agent, or Firm*—Greenblum & Bernstein, P.L.C.

(57) ABSTRACT

Method of regulating a water level of a dam installation having a plurality of turbine generator units arranged to generate electrical power, wherein at least some of the plurality of turbine generator units are arranged at least one of one above another and one beside another so as to form at least one turbine generator module. The method includes regulating, at least to some extent, the water level to a predefinable set point by starting or stopping at least one of the plurality of turbine generator units and adjusting, in discrete steps, a quantity of water which can flow through the dam installation, wherein a discrete step is defined by a quantity of water which can flow through a defined number of turbine generator units.

81 Claims, 2 Drawing Sheets

U.S. PATENT DOCUMENTS

| | | | |
|---|---|---|---|
| 4,674,279 A | 6/1987 | Ali et al. | 60/398 |
| 4,683,718 A | 8/1987 | Larsson | 60/327 |
| 4,772,157 A | 9/1988 | Obermeyer | 405/75 |
| 4,787,774 A * | 11/1988 | Grove | 405/94 |
| 4,804,855 A | 2/1989 | Obermeyer | 290/54 |
| 4,874,999 A * | 10/1989 | Kuwabara et al. | 318/610 |
| 5,800,077 A * | 9/1998 | March | 405/92 |
| 5,878,447 A * | 3/1999 | Mogab et al. | 4/508 |
| 6,067,854 A * | 5/2000 | Yang | 73/305 |
| 6,229,448 B1 * | 5/2001 | Bennett et al. | 340/618 |
| 6,269,287 B1 * | 7/2001 | March | 700/287 |
| 6,276,200 B1 * | 8/2001 | Cazden | 73/305 |
| 6,281,597 B1 | 8/2001 | Obermeyer et al. | 290/54 |
| 6,359,347 B1 * | 3/2002 | Wolf | 290/54 |
| 6,490,506 B1 * | 12/2002 | March | 290/54 |
| 6,502,461 B1 * | 1/2003 | Keller | 73/305 |
| 6,718,567 B1 * | 4/2004 | Gibson et al. | 4/508 |
| 6,861,766 B1 * | 3/2005 | Rembert | 280/43 |
| 6,863,806 B1 * | 3/2005 | Stark et al. | 210/170 |
| 6,910,498 B1 * | 6/2005 | Cazden | 137/392 |
| 6,978,575 B1 * | 12/2005 | Bradley | 47/66.1 |
| 6,997,053 B1 * | 2/2006 | Forshey et al. | 73/296 |
| 2005/0244957 A1 * | 11/2005 | Stock | 435/289.1 |

FOREIGN PATENT DOCUMENTS

| | | |
|---|---|---|
| DE | 4104797 | 8/1992 |
| DE | 19717871 | 10/1998 |
| EP | 0174287 | 3/1986 |
| EP | 0435182 | 7/1991 |
| JP | 2005304661 A * | 11/2005 |
| JP | 2006022668 A * | 1/2006 |
| WO | 98/11343 | 3/1998 |

* cited by examiner

METHOD FOR REGULATING THE LEVEL OF A DAM INSTALLATION AND DAM INSTALLATION IMPLEMENTING THE METHOD

CROSS-REFERENCE TO RELATED APPLICATIONS

The instant application is a continuation of International Application No. PCT/EP02/13278 filed on Nov. 26, 2002 and published as International Publication WO 03/054387 on Jul. 3, 2003, the disclosure of which is hereby expressly incorporated by reference hereto in its entirety. The instant application also claims priority under 35 U.S.C. §119 of Austrian Application No. A 2001/2001 filed on Dec. 20, 2001.

BACKGROUND OF THE INVENTION

1. Field of the Invention

The invention relates to a method for regulating the level of a dam installation, preferably a dam or a weir. A number of turbine generator units, preferably with outputs between 100 kW and 1000 kW each, are arranged in the dam installation to generate electrical power. At least some units are arranged above one another and/or beside one another and are connected to one another to form one or more turbine generator modules.

The invention also relates to a plant for regulating the level of a dam installation having a plurality of turbine generator units which are arranged above one another and/or beside one another, and which are connected to one another to form one or more turbine generator modules. If appropriate, a predetermined number of turbine generator modules are arranged beside one another and supported on the dam installation.

2. Description of the Prior Art

Equipment for generating electrical power, in which a number of relatively small turbine generator units are arranged in rows and columns beside one another and above one another in a frame or a stiffened construction are disclosed, for example, in documents WO98/11343 and U.S. Pat. No. 4,804,855. Because of their particularly short design and large inflow area, such equipment is preferably used on dam installations such as sluices, weirs, dams or the like, in order to use the quantity of water flowing through and normally unused in order to produce electrical power. In such dam installations, however, the water level must be regulated in order to fulfill the function of the dam installation. This is required depending on the application. For example, ship traffic on a river requires a specific water level, or an irrigation dam must have a minimum water level in order to be able to ensure the irrigation. For this purpose, weir systems have hitherto been wholly or partially opened.

SUMMARY OF THE INVENTION

The invention provides for a method for regulating the level of a dam installation which utilizes the existing possibilities and constructional conditions to the greatest possible extent. The invention also ensures the function of the dam installation and permits simple and accurate regulation.

According to the invention, the level is regulated to a predefinable set point, at least to some extent, by starting or stopping individual or several turbine generator units or turbine generator modules.

These turbine generator units or turbine generator modules have an accurately known flow. As a result, the quantity flowing away can be determined accurately. The quantity flowing away and, consequently, also the level of the dam installation can therefore be regulated very simply and accurately in small discrete steps by way of the individual turbine units. It is therefore no longer necessary, in exceptional situations, to open or to close the weir systems, which are generally very large, heavy and difficult to regulate.

With such an arrangement, the regulation becomes more flexible, because it is possible to perform the regulation in small steps. This permits a quick reaction to changing conditions on the dam installation. Furthermore, as a result, the level can be optimized very simply with regard to specific criteria.

The turbine generator units or turbine generator modules used to regulate the level can be designed very simply, in constructional terms, if these units or modules are operated with a substantially constant flow or with a constant output. This is possible because no equipment for regulating the flow or the output has to be provided. The units or turbines therefore have only two operating points, namely in operation or out of operation, which also simplifies the regulation considerably.

If the level is regulated, at least to some extent, by opening or closing at least one weir system, in certain situations, the quantity flowing away can be increased quickly. This is primarily expedient as a safety measure in situations where the flow through the turbine units is no longer sufficient to discharge the inflowing quantities of water again, or where the outflow from the dam installation has to be reduced very quickly.

It is particularly advantageous to predefine an upper turbine switching level or alarm level at which, when it is reached, turbine generator units or turbine generator modules are started and/or weir systems are opened. It is likewise advantageous, when a predefined lower turbine switching level or alarm level is reached, to stop turbine generator units or turbine generator modules and/or to close weir systems. As a result, the maintenance of the required limiting values for the level is ensured and, at the same time, the number of switching manipulations of the turbine units is reduced.

The generation of electrical power by the turbine units can be maximized if all the turbine generator units or turbine generator modules are started first and only then are the weir systems opened. Likewise, maximization of the generation of electrical power is achieved if all the weir systems are opened first and only then are the turbine generator units or turbine generator modules stopped. By way of these measures, the flow through the turbine units is maximized, which has a directly positive effect on the amount of power generated.

It is quite particularly advantageous if, when a predefined turbine switching level and/or alarm level is reached, an alarm signal is generated and/or indicated. It is then possible to react directly and without any time delay to the current critical situation. These alarm signals can, for example, be of an acoustic and/or optical nature.

If automatic switching manipulation to start or stop turbine generator units or turbine generator modules and/or the opening or closing of weir systems are initiated by the triggering of an alarm, the regulation of the level can be carried out automatically to the greatest possible extent without any operating personnel required on site.

By drawing up predictions about levels to be expected in the future, and the associated opening and closing of turbine generator units or turbine generator modules and/or weir systems by using these predictions, it is possible to react in a predictive way to large level changes to be expected. As a result, the switching frequency of the weir systems can be reduced.

If the regulation systems of the levels of a plurality of dam installations following one another are coupled to one another, and individual dam installations are regulated by a higher-order regulation system, in such a way that the levels of these dam installations are optimized, whilst taking each other into account, then an optimum level can be achieved far beyond a single dam installation. This can occur along a long section of the water course. As a result, the frequency of starting and stopping turbine units is reduced and, at the same time, more uniform power generation can be achieved over a relatively long time period.

A further advantageous expansion of the regulation concept can be achieved if the number of turbine generator units or turbine generator modules to be started or stopped is determined in advance, and they are started and stopped at the same time. Then the switching manipulations are required to correct the level can be carried out in one sequence.

It is beneficial to determine the number of turbine generator units or turbine generator modules to be started or stopped by using the current power demand and possibly also by using a level to be expected in the future. As a result, optimum utilization with regard to the power demand, the units, and modules is achieved.

It is quite particularly advantageous to optimize the regulation systems of the levels with regard to the power generation. The optimization is very advantageously carried out with the aid of a mathematical model which, in order to improve the optimization results, takes account of specific states and boundary conditions, such as the temporary opening or closing of weirs, dams, sluices, and if appropriate, the raising of turbine generator or turbine generator modules, inputs from the operating personnel, stored empirical values, physical laws, such as the amount of water evaporated or seeping away, and current or predictive meteorological data, such as rainfall to be expected, temperature predictions, etc. Furthermore, by using the mathematical model and taking account of the current inflow and outflow and/or that to be expected and the current power demand and/or that to be expected, the optimum number of turbine generator units or turbine generator modules to be started or stopped can be determined very advantageously.

The set point used for the regulation is advantageously level over a predetermined time period, such as a year.

The power to be generated can be predefined over a predetermined time range, preferably one day, and the level can be regulated in such a way that the predefined power generation course can be maintained as accurately as possible. As a result, optimum utilization of the action of obtaining power is achieved whilst ensuring the actual function of the dam installation. At the same time, it is ensured by this arrangement that the resources of the dam installation are utilized to the greatest possible extent.

If the levels of one or more dam installations can be regulated from a central control center, additional monitoring and control devices on site can be saved, which has a very positive effect on the costs.

If the set point for the level is predefined for a purpose which is not used for obtaining power, for example for ship traffic, irrigation, etc., the originally conceived operation of the dam installation is not impaired. Obtaining power is then an additional advantage and can be achieved without any restrictions on the operation.

In practice, it can be advantageous if at least approximately 10, and preferably between approximately 20 and approximately 500, turbine generator units, which can be started and stopped, are used on a dam installation.

It is furthermore very advantageous if the dam installation has a plurality of piers, between which the medium can flow past. A predetermined number of turbine generator units or turbine generator modules can be arranged between two adjacent piers and supported on the piers. As a result, already existing structures of the dam installation can be used directly for retrofitting, as no complicated rebuilding work is necessary.

A very compact design variant is obtained by the equipment for starting and stopping turbine generator units or turbine generator modules being integrated in the units or modules and supported on the piers by the unit or the module. As a result, the necessary constructional measures on the dam installation are also minimized. A further variant provides for the equipment for starting and stopping turbine generator units or turbine generator modules being supported directly on the piers.

The turbine generating units or turbine generator modules can be removed very simply from their operating position. This can occur, for example, for maintenance work or to open the flow cross section in certain situations, and provided such units or modules are arranged such that they can be raised and lowered.

A quite particularly advantageous application finds the regulation according to the invention of the level of a dam installation in a drinking water reservoir, an irrigation dam, a flood retention basin, a dam for regulating a navigation or a dam station in a hydroelectric power station.

The invention also provides for a method of regulating a water level of a dam installation comprising a plurality of turbine generator units arranged to generate electrical power, wherein at least some of the plurality of turbine generator units are arranged at least one of one above another and one beside another so as to form at least one turbine generator module, wherein the method comprises regulating, at least to some extent, the water level to a predefinable set point by starting or stopping at least one of the plurality of turbine generator units, wherein the regulating adjusts, in discrete steps, a quantity of water which can flow through the dam installation, and wherein a discrete step is defined by a quantity of water which can flow through a defined number of turbine generator units.

The dam installation may be arranged on a dam. The dam installation may comprise a weir. Each of the plurality of turbine generator units may have an output which is between approximately 100 kW and approximately 1000 kW.

The regulating may comprise regulating, at least to some extent, the water level to a predefinable set point by starting or stopping at least two of the plurality of turbine generator units. The regulating may comprise regulating, at least to some extent, the water level to a predefinable set point by starting or stopping at least one turbine generator module. The regulating may comprise regulating, at least to some extent, the water level to a predefinable set point by starting or stopping at least two turbine generator modules.

The defined number of turbine generator units may be one turbine generator unit. The defined number of turbine generator units may be at least two turbine generator units. The defined number of turbine generator units may be one turbine generator module. The defined number of turbine generator units may be at least two turbine generator modules.

The method may further comprise operating the at least one of the plurality of turbine generator units at constant output and with a substantially constant flow rate.

The regulating may comprise at least one of opening and closing at least one weir system. The regulating may comprise at least one of opening and closing at least one additional weir system.

The regulating may comprise starting the at least one of the plurality of turbine generator units when a predefined upper turbine switching level is reached. The method may further comprise, after the regulating, opening a weir system when the predefined upper turbine switching level is reached.

The regulating may comprise starting the at least one turbine generator module when a predefined upper turbine switching level is reached. The regulating may comprise opening a weir system when a predefined upper turbine switching level is reached. The predefinable set point may be an upper turbine switching level. The predefinable set point may be a predefined upper alarm level.

The regulating may comprise starting the at least one of the plurality of turbine generator units when a predefined upper alarm level is reached. The method may further comprise, after the regulating, opening a weir system when the predefined upper alarm level is reached.

The regulating may comprise starting the at least one turbine generator module when a predefined upper alarm level is reached. The regulating may comprise opening a weir system when a predefined upper alarm level is reached. The regulating may comprise starting each of the plurality of turbine generator units when a predefined upper turbine switching level is reached, and further comprising, after the regulating, opening a weir system when the predefined upper turbine switching level is reached. The regulating may comprise starting each of the plurality of turbine generator units when a predefined upper alarm level is reached, and further comprising, after the regulating, opening a weir system when the predefined upper alarm level is reached. The regulating may comprise stopping the at least one of the plurality of turbine generator units when a predefined lower turbine switching level is reached. The regulating may comprise stopping the at least one turbine generator module when a predefined lower turbine switching level is reached.

The regulating may comprise stopping the at least one of the plurality of turbine generator units when a predefined lower alarm level is reached. The regulating may comprise stopping the at least one turbine generator module when a predefined lower alarm level is reached. The regulating may comprise stopping the least one of the plurality of turbine generator units when a predefined lower alarm level is reached, and further comprising, after the regulating, closing a weir system when the predefined lower alarm level is reached. The regulating may comprise stopping the least one of the plurality of turbine generator units when a predefined lower alarm level is reached, and further comprising, before the regulating, closing each weir system when the predefined lower alarm level is reached.

The predefinable set point may comprise one of a predefined upper turbine switching level and a predefined lower turbine switching level. The predefinable set point may comprise one of a predefined upper alarm level and a predefined lower alarm level The method may further comprise generating an alarm signal when one of the predefined upper and lower alarms levels are reached. The alarm signal may comprise at least one of an acoustic signal and an optical alarm signal.

The method may further comprise starting automatically the at least one of the plurality of turbine generator units when the water level reaches the predefinable set point. The method may further comprise stopping automatically the at least one of the plurality of turbine generator units when the water level reaches the predefinable set point. The method may further comprise predicting a future water level and setting the predefinable set point based on the future water level. The method may further comprise sending information from the dam installation to at least one other dam installation. The method may further comprising coupling the dam installation to at least one other dam installation, controlling each dam installation with a higher-order regulation system, and optimizing a performance of each dam installation.

The method may further comprise, before the regulating, determining the defined number of turbine generator units, and wherein regulating further comprises regulating, at least to some extent, the water level to a predefinable set point by starting or stopping at least two of the plurality of turbine generator units substantially simultaneously. The method may further comprise determining the defined number of turbine generator units based on a current power demand. The method may further comprise determining the defined number of turbine generator units based on a future power demand and based upon a future expected power demand. The method may further comprise optimizing power generation based on the regulating. The method may further comprise optimizing power generation using a mathematical model.

The method may further comprise determining an optimum number of turbine generator units for power generation using a mathematical model that takes account of at least one of current water inflow, current water outflow, future water inflow, future water outflow, current power demand, and future power demand. The mathematical model may take account of at least one of a temporary opening of a weir, a dam, and a sluice. The mathematical model may take account of at least one of a temporary closing of a weir, a dam, and a sluice. The mathematical model may take account of at least one of a raised position of a turbine generator unit, a raised position of a turbine generator module, inputs from operating personnel, stored empirical values, physical laws, a quantity of water evaporating away, a quantity of water seeping away, current meteorological data, and predictive meteorological data, expected rainfall, and temperature predictions.

The method may further comprise determining an expected water level of the dam installation for predetermined time period, and setting the predefinable set point based on the expected water level. The predetermined time period may be one year. The method may further comprise determining an expected power demand of the dam installation for predetermined time period, and setting the predefinable set point based on the expected power demand. The predetermined time period may be one day.

The method may further comprise raising at least one of the plurality of turbine generator units in order to open a flow cross-section in the dam installation. The method may further comprise coupling the dam installation to at least one other dam installation and a central control center, wherein each dam installation is controllable via the central control center. The method may further comprise determining the predefinable set point based on at least one of information which unrelated to power generation, navigation considerations, and irrigation considerations, etc.

The plurality of turbine generator units may comprise at least approximately 10 turbine generator units. The plurality of turbine generator units may comprise between approximately 20 and approximately 500 turbine generator units.

The invention also provides for a plant for regulating a water level of a dam installation comprising a plurality of turbine generator units arranged at least one of one above another and one beside another, wherein the plurality of turbine generator units are connected to one another and form at least one turbine generator module, wherein the method comprises a regulating system structured and arranged to start and stop, at least to some extent, at least one of the plurality of turbine generator units. The regulating system is configured to adjust, in discrete steps, a quantity of water which can flow through the dam installation, wherein a discrete step is defined by a quantity of water which can flow through a defined number of turbine generator units.

The dam installation may be arranged on a dam. The dam installation may comprise a weir. Each of the plurality of turbine generator units may have an output which is between approximately 100 kW and approximately 1000 kW. The at least one of the plurality of turbine generator units may be adapted to operate with one of a substantially constant flow rate and a substantially constant output. The regulating system may comprise a device for opening and closing at least one weir system. The dam installation may comprise a plurality of piers between which a medium can flow past, and wherein the plurality of turbine generating units are arranged between and supported by two adjacent piers.

The regulating system may be integrated into at least one of the plurality of turbine generator units. The regulating system may be integrated into the at least one turbine generator module. The regulating system may be supported on piers of the dam installation. The regulating system may be supported directly on piers of the dam installation. The plurality of turbine generator units may be capable of being raised and lowered. The at least one turbine generator module may be capable of being raised and lowered.

The plant may further comprise a central control center adapted to regulate the water level of the dam installation. The central control center may be adapted to also regulate the water level of another dam installation.

The dam installation may be arranged on a navigation dam. The dam installation may be arranged on a drinking water reservoir. The dam installation may be arranged on an irrigation dam. The dam installation may be arranged on a flood retention basin. The dam installation may comprise a dam stage of a hydroelectric power station.

The invention also provides for a method of regulating a water level of a dam installation between an upper predetermined set point and a lower predetermined set point, wherein the method comprises starting a number of turbine generator units when the water level reaches the upper predetermined set point, stopping a number of turbine generator units when the water level reaches the lower predetermined set point, and adjusting the starting and stopping to ensure that the water level is maintained between the upper predetermined set point and the lower predetermined set point, wherein the adjusting regulates a quantity of water which can flow through the turbine generator units.

The invention also provides for a system for regulating a water level of a dam installation between an upper predetermined set point and a lower predetermined set point, wherein the dam installation comprises turbine generator units, wherein the system comprises an arrangement for indicating a current water level, an arrangement for starting a number of turbine generator units when the water level reaches the upper predetermined set point and for stopping a number of turbine generator units when the water level reaches the lower predetermined set point, and an arrangement for adjusting the starting and the stopping to ensure that the water level is maintained between the upper predetermined set point and the lower predetermined set point, wherein the arrangement for adjusting the starting and the stopping comprises one of a computer system and an alarm system.

BRIEF DESCRIPTION OF THE DRAWINGS

The present invention is further described in the detailed description which follows, in reference to the noted plurality of drawings by way of non-limiting exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
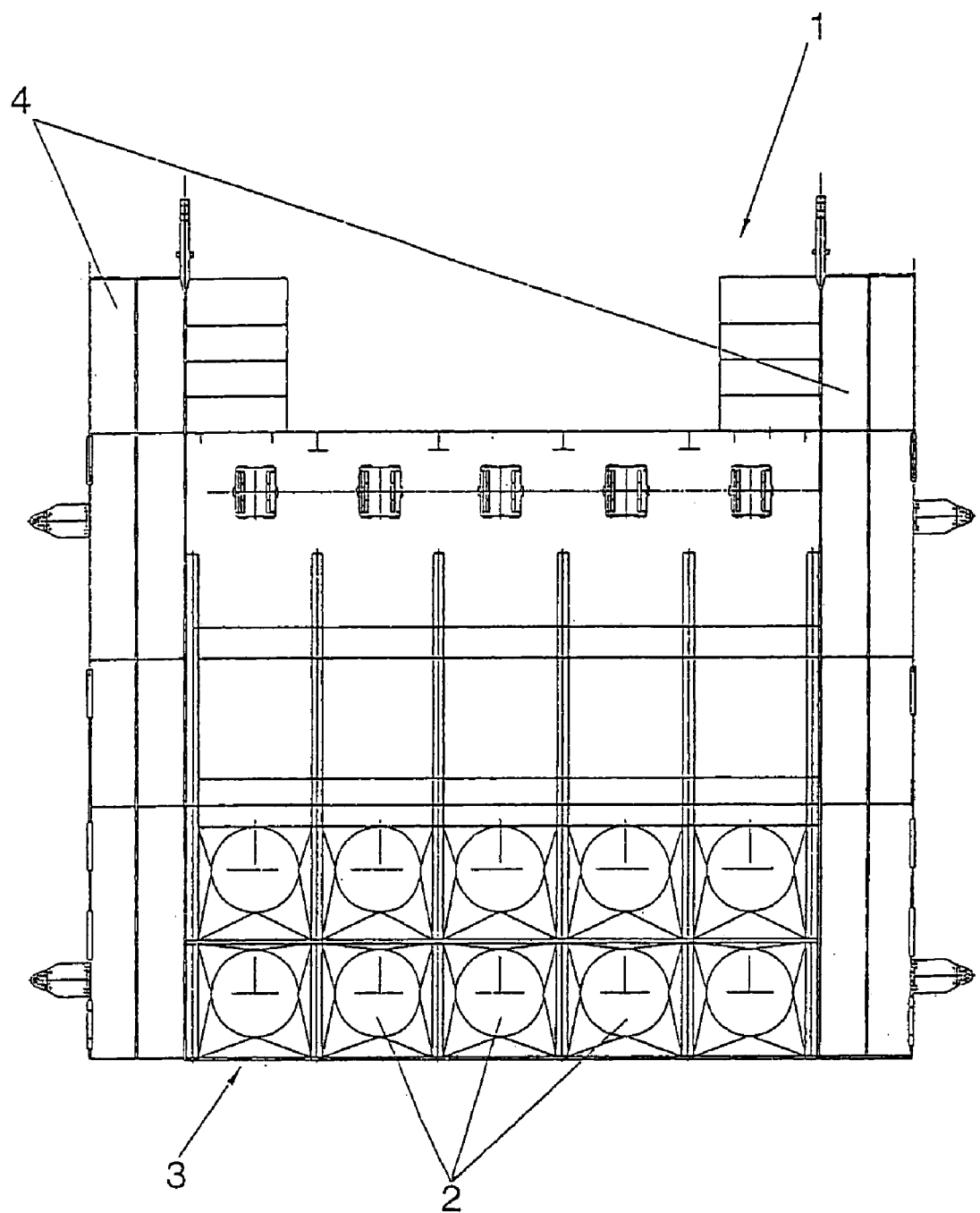
FIG. 1 shows a front view of a dam installation with turbine generator units.

FIG. 1 shows, in schematic and simplified form, a dam installation 1. The dam may be, for example, a dam for damming a liquid, preferably water in the course of a river. The installation 1 has two piers 4 in this exemplary embodiment. A number of turbine generator units 2, ten here, are arranged between the piers 4. These turbine generator units 2 are, in this case, supported and held by the piers 4. The turbine generator units 2 are combined to form a turbine generator module 3 and, as required, can be lifted out of the dam installation 1 as a module by a lifting device (not shown). Furthermore, the dam installation 1 can also utilize a weir system (not shown), with which the outflow of the medium from the dam installation 1 can be wholly or partially opened or stopped.

The turbine generator units 2 can be shut off in an adequately well-known manner, for example, by an intake-pipe closure, such as, e.g., a bulkhead or an iris diaphragm. This can occur individually or in groups. The entire turbine generator module 3 can also be shut off. In this way, no water will be allowed to flow through the turbine generator units 2 and consequently, no electrical power will be generated by these units.

It is obvious that such a dam installation can also utilize more than two piers and that more than the turbine generator units 2 illustrated in FIG. 1 can be arranged between the two piers 4. In practice, it is entirely conceivable to integrate any desired number of such turbine generator units 2 in a dam installation 1, and preferably between approximately 20 and approximately 500.

Such turbine generator units 2 can, of course, also be used in any desired dam installations other than those shown and described with regard to FIG. 1. These include, e.g., drinking water reservoirs, irrigation dams, flood retention basins, etc. Of course, it is possible for the regulation concept described below to be used for the level of any type of dam installation.

Figure 2:
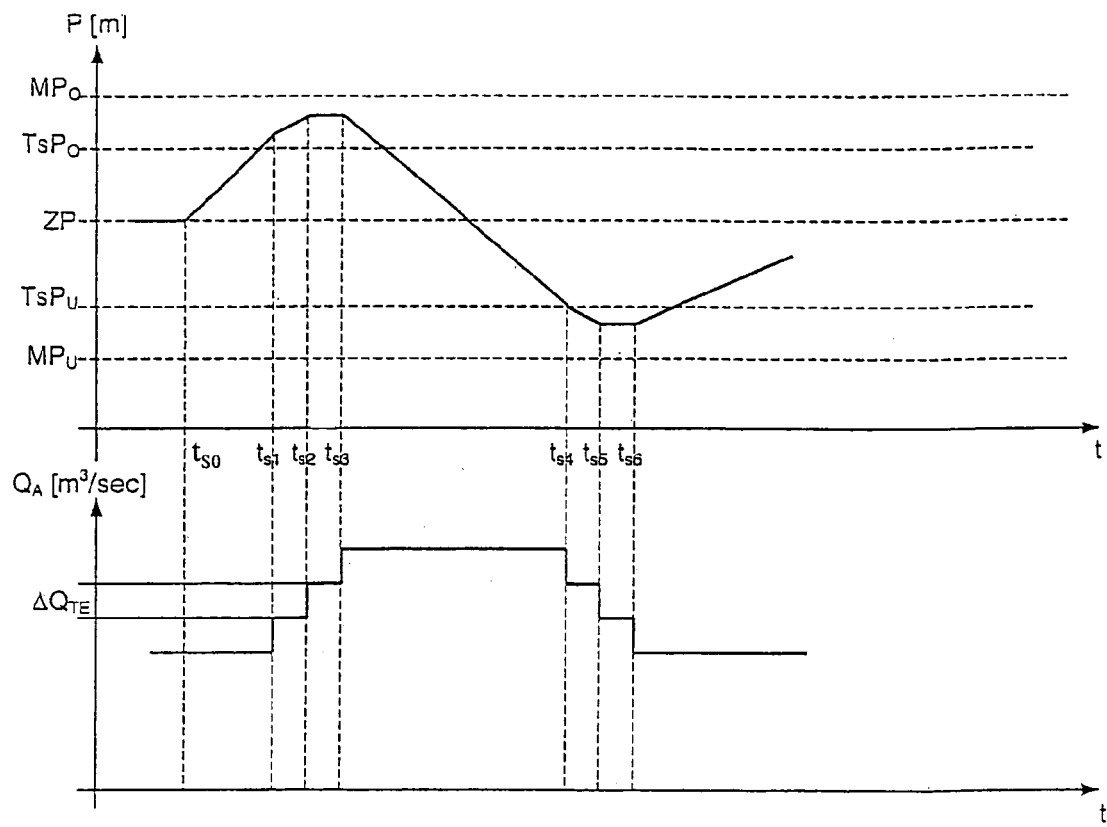
FIG. 2 shows the basic principle of the regulation according to the invention.

With reference to FIG. 2, one can discern the basic principle of the regulation procedure and/or process according to the invention of the level of any desired dam installation with integrated turbine generator units 2. FIG. 2 illustrates two graphs. The first graph shows the water level over the time t. The second graph shows the quantity $Q_A$ flowing away from the dam installation over the time t. A target level ZP is predefined for the dam installation, for example, by an operator. The current water level is then allowed to vary within likewise predefined upper and lower turbine switching levels $TsP_O$, $TsP_U$. These levels result from the requirements on the dam installation. For example, ship traffic on a river requires specific minimum and maximum water levels. Furthermore, upper and lower maximum levels $MP_O$, $MP_U$, which must not be violated, are also defined for the dam installation. These levels can be set so that if these maximum levels are nevertheless violated (such as e.g., in exceptional situations), certain emergency measures can be initialed. Such measures can include, e.g., shutting off or opening further dam installations placed upstream, opening existing emergency sluices, lifting of the turbine generator units 2 or modules 3, etc. Such measures will, of course, depend on the particular dam installation.

The starting point of the regulation method is a state in which the inflow and the outflow quantities are equal, and the level does not change. In this state, an arbitrary number of turbine generator units 2 or turbine generator modules 3 are already open, so that a certain quantity of water $Q_A$ already flows away through these units and electrical power is generated.

At the time $t_{s0}$, the water level P of the dam installation 1 then rises, for example, because of rainfall, starting from the target level ZP. At the time $t_{s1}$, it reaches the upper turbine switching level $TsP_O$. At the latest at this time $t_{s1}$, automatically or by the operating personnel, one or more further individual turbine generator units 2 or turbine generator modules 3 are then started in order to increase the quantity $Q_A$ flowing away. As a result, more electrical power will be generated simultaneously, so to speak, as a secondary effect. This increase in the quantity flowing away represents a discrete increase $\Delta Q_{TE}$ or a multiple thereof, and corresponds exactly to that quantity of water which can flow through the turbine generator unit(s) 2 or turbine generator modules 3. Since the level P increases further, at the times $t_{s2}$ and $t_{s3}$, additional turbine generator units 2 or turbine generator modules 3 are started. As a result, the quantity $Q_A$ flowing away is further increased discretely by $\Delta Q_{TE}$ or a multiple thereof in each case.

This is repeated until the level falls below the upper turbine switching level $TsP_O$ again. If all the turbine generator units 2 or turbine generator modules 3 have already have been started and the level P rises further, then further weir systems (which may possibly be present) can also be opened. As a result, the quantity $Q_A$ flowing away is increased further. Weir systems should, in principle, be opened only when all the turbine generator units 2 or turbine generator modules 3 are already started, since the generation of electrical power can then (of course) be maximized. However, it is of course also conceivable to open the weir systems at an earlier time for specific reasons.

As can further be discerned from FIG. 2, the now falling water level P reaches the lower turbine switching level $TsP_U$ at the time $t_{s4}$, at which time the converse procedure begins. Turbine generator units 2 or turbine generator modules 3 are gradually stopped, e.g., automatically or by the operating personnel, until the level P is again within the two limiting values, i.e., the upper and lower turbine switching levels $TsP_O$, $TsP_U$.

Of course, it is also conceivable to determine the required number of turbine generator units 2 or turbine generator modules 3 to be started or stopped and to open or close the latter simultaneously by, e.g., using the level increase or the level decrease, using empirical values, or using mathematical or simulation models.

As long as the level P is within one of the two limiting values $TsP_O$, $TsP_U$, as a rule no switching manipulations are carried out, so that the quantity $Q_A$ flowing away during this time period remains substantially constant.

In this exemplary embodiment, in simplified form, only three turbine generator units 2 or turbine generator modules 3 are started. In practice, however, as many as 20 or more individually switchable turbine generator units 2 or turbine generator modules 3 are integrated in one dam installation. Using such arrangements, very fine regulation of the water level P of the dam installation can be achieved.

When the upper or lower turbine switching levels $TsP_O$, $TsP_U$ are reached, an alarm can also be triggered. This can be indicated and/or implemented, for example, in a control center or by way of an acoustic signal, and has the effect of making the operating personnel aware of the present situation. Such an alarm can also be used to trigger an automatic switching manipulation procedure.

Figure 3:
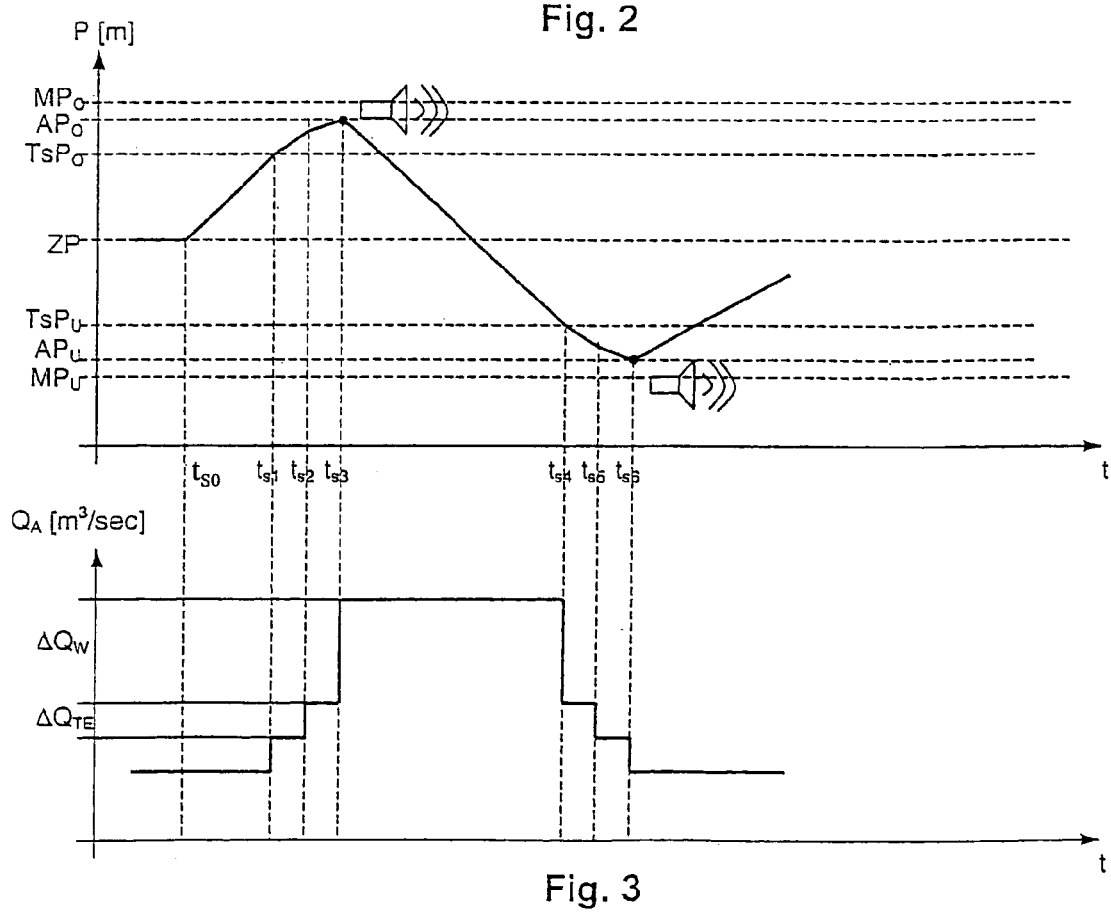
FIG. 3 shows an extended regulation concept.

FIG. 3 shows an extended regulation process and/or procedure. In addition to the limiting levels already described with regard to FIG. 2, an upper and lower alarm level $AP_O$, $AP_U$ can also be predefined. These levels will in practice lie close, for example, approximately 5 cm, above and below the upper and lower maximum levels $MP_O$, $MP_U$, respectively.

As already described with regard to FIG. 2, the water level P rises from the time $t_{s0}$ and, at the time $t_{s3}$, following two switching manipulations at the times $t_{s1}$ and $t_{s2}$, reaches the upper alarm level $AP_O$. The dam installation is ideally designed in such a way that, at the time $t_{s3}$, all the turbine generator units 2 or turbine generator modules 3 are already started, so that the maximum flow through the turbines, and therefore also the maximum power generation, has been reached. At the time $t_{s3}$, in this example, an acoustic alarm is generated, in order, for example, to make the operating personnel aware of the critical level P. Of course, this acoustic alarm can also be coupled to an automatic switching manipulation. Then, any weir systems, which may still be present, are opened. As a result, the quantity $Q_A$ flowing away can be increased by $\Delta Q_w$ of the weir system. Then, the level P begins to fall again. As an additional measure for reducing the level P, provision can also be made to raise the entire turbine generator units 2 or turbine generator modules 3.

At the time $t_{s4}$, the now falling level P reaches the lower turbine switching level $TsP_U$. If, at this time, the weir systems are still open or if not all of the turbine generator units 2 or turbine generator modules 3 (which may have been raised) have been lowered into their operating position, then these should be closed or lowered first, before turbine generator units 2 or turbine generator modules 3 are stopped.

This will maximize the power generation. In this example, at the time $t_{s4}$, a weir system is stopped first and, in the further sequence, at the time $t_{s5}$, a turbine generator unit 2 or a turbine generator module 3 is stopped. At the time $t_{s6}$, the lower alarm level $AP_U$ is then reached. An acoustic alarm is in turn triggered and at least one further turbine generator unit 2 or one further turbine generator module 3 is stopped, so that the level P again exhibits a rising trend. Of course, if necessary, a plurality of (or even all of) the still active turbine generator units 2 or turbine generator modules 3 could also be stopped simultaneously at the time $t_{s6}$.

The examples described above are in each case based on current measurements of the level or the level change. However, it is also conceivable to make forecasts about future levels, for example, by taking account of levels of dam installations located upstream, weather situations, empirical values, etc. and, by using these forecasts, to regulate the quantity $Q_A$ flowing away in a predictive manner by starting or stopping individual turbine generator units 2 or turbine generator modules 3 in such a way that the level P lies as far as possible within the upper and lower turbine switching levels $TsP_O$, $TsP_U$ and, if possible, does not violate these levels.

The power demand varies very greatly over a certain time period. For example, more power is consumed during the day than in the evening, or more power is consumed in winter than in summer. The method can then be applied particularly advantageously if the level P is also optimized with regard to the requirements, which are different over a time period, on the power generation. For example, overnight all the excess turbine generator units 2 or turbine generator modules 3 can be stopped. As a result, the level P rises overnight and then, can then be dissipated again by the turbine generator units 2 or turbine generator modules 3 for the purpose of generating power, as a consequence of the power demand peak times during the day.

Likewise, the level P could generally be kept at a high level in winter in order to be able to assist the coverage of power demand peaks.

Likewise, the level could also generally always be kept to the maximum level, in order that the power generation is always as high as possible.

The optimization can be carried out by way of a mathematical model of the dam installation 1, in which, if required, specific other boundary conditions, such as the temporary opening or closing of additional weir systems, inputs by the operating personnel or meteorological data, can also be incorporated. At the same time, by using the mathematical model as required, specific parameters, such as the optimum number of turbine generator units 2 or turbine generator modules 3 and/or weir systems to be opened or closed can also be determined.

Expediently, and by way of non-limiting example, the levels P of one or more dam installations 1 can be regulated from a single central control center. For this purpose, the necessary data with regard to the levels P can be transmitted to the control center, for example, via a modem or by radio transmission, and supplied to a regulation algorithm, which is preferably implemented on a computer. From the control center, the required control signals, primarily commands to open or close turbine generator units 2 or turbine generator modules 3, can then supplied back to the dam installation(s).

What is claimed is:

1. A method of regulating a water level of a dam installation comprising a plurality of turbine generator units arranged to generate electrical power, wherein at least some of the plurality of turbine generator units are arranged at least one of one above another and one beside another so as to form at least one turbine generator module, the method comprising:
   regulating, at least to some extent, the water level to a predefinable set point by starting or stopping at least one of the plurality of turbine generator units; and
   maintaining the water level between upper and lower predetermined set points,
   wherein the regulating adjusts, in discrete steps, a quantity of water which can flow through the dam installation, and
   wherein a discrete step is defined by a quantity of water which can flow through a defined number of turbine generator units.

2. The method of claim 1, wherein the dam installation is arranged on a dam.

3. The method of claim 1, wherein the dam installation comprises a weir.

4. The method of claim 1, wherein each of the plurality of turbine generator units have an output which is between approximately 100 kW and approximately 1000 kW.

5. The method of claim 1, wherein the regulating comprises regulating, at least to some extent, the water level to a predefinable set point by starting or stopping at least two of the plurality of turbine generator units.

6. The method of claim 1, wherein the regulating comprises regulating, at least to some extent, the water level to a predefinable set point by starting or stopping at least one turbine generator module.

7. The method of claim 1, wherein the regulating comprises regulating, at least to some extent, the water level to a predefinable set point by starting or stopping at least two turbine generator modules.

8. The method of claim 1, wherein the defined number of turbine generator units is one turbine generator unit.

9. The method of claim 1, wherein the defined number of turbine generator units is at least two turbine generator units.

10. The method of claim 1, wherein the defined number of turbine generator units is one turbine generator module.

11. The method of claim 1, wherein the defined number of turbine generator units is at least two turbine generator modules.

12. The method of claim 1, further comprising operating the at least one of the plurality of turbine generator units at constant output and with a substantially constant flow rate.

13. The method of claim 1, wherein the regulating comprises at least one of opening and closing at least one weir system.

14. The method of claim 13, wherein the regulating comprises at least one of opening and closing at least one additional weir system.

15. The method of claim 1, wherein the regulating comprises starting the at least one of the plurality of turbine generator units when a predefined upper turbine switching level is reached.

16. The method of claim 15, further comprising, after the regulating, opening a weir system when the predefined upper turbine switching level is reached.

17. The method of claim 1, wherein the regulating comprises starting the at least one turbine generator module when a predefined upper turbine switching level is reached.

18. The method of claim 1, wherein the regulating comprises opening a weir system when a predefined upper turbine switching level is reached.

19. The method of claim 1, wherein the predefinable set point is an upper turbine switching level.

20. The method of claim 1, wherein the predefinable set point is a predefined upper alarm level.

21. The method of claim 1, wherein the regulating comprises starting the at least one of the plurality of turbine generator units when a predefined upper alarm level is reached.

22. The method of claim 21, further comprising, after the regulating, opening a weir system when the predefined upper alarm level is reached.

23. The method of claim 1, wherein the regulating comprises starting the at least one turbine generator module when a predefined upper alarm level is reached.

24. The method of claim 1, wherein the regulating comprises opening a weir system when a predefined upper alarm level is reached.

25. The method of claim 1, wherein the regulating comprises starting each of the plurality of turbine generator units when a predefined upper turbine switching level is reached, and further comprising, after the regulating, opening a weir system when the predefined upper turbine switching level is reached.

26. The method of claim 1, wherein the regulating comprises starting each of the plurality of turbine generator units when a predefined upper alarm level is reached, and further comprising, after the regulating, opening a weir system when the predefined upper alarm level is reached.

27. The method of claim 1, wherein the regulating comprises stopping the at least one of the plurality of turbine generator units when a predefined lower turbine switching level is reached.

28. The method of claim 1, wherein the regulating comprises stopping the at least one turbine generator module when a predefined lower turbine switching level is reached.

29. The method of claim 1, wherein the regulating comprises stopping the at least one of the plurality of turbine generator units when a predefined lower alarm level is reached.

30. The method of claim 1, wherein the regulating comprises stopping the at least one turbine generator module when a predefined lower alarm level is reached.

31. The method of claim 1, wherein the regulating comprises stopping the least one of the plurality of turbine generator units when a predefined lower alarm level is reached, and further comprising, after the regulating, closing a weir system when the predefined lower alarm level is reached.

32. The method of claim 1, wherein the regulating comprises stopping the least one of the plurality of turbine generator units when a predefined lower alarm level is reached, and further comprising, before the regulating, closing each weir system when the predefined lower alarm level is reached.

33. The method of claim 1, wherein the predefinable set point comprises one of a predefined upper turbine switching level and a predefined lower turbine switching level.

34. The method of claim 1, wherein the predefinable set point comprises one of a predefined upper alarm level and a predefined lower alarm level.

35. The method of claim 34, further comprising generating an alarm signal when one of the predefined upper and lower alarms levels are reached.

36. The method of claim 35, wherein the alarm signal comprises at least one of an acoustic signal and an optical alarm signal.

37. The method of claim 1, further comprising starting automatically the at least one of the plurality of turbine generator units when the water level reaches the predefinable set point.

38. The method of claim 1, further comprising stopping automatically the at least one of the plurality of turbine generator units when the water level reaches the predefinable set point.

39. The method of claim 1, further comprising predicting a future water level and setting the predefinable set point based on the future water level.

40. The method of claim 1, further comprising sending information from the dam installation to at least one other dam installation.

41. The method of claim 1, further comprising coupling the dam installation to at least one other dam installation, controlling each dam installation with a higher-order regulation system, and optimizing a performance of each dam installation.

42. The method of claim 1, further comprising, before the regulating, determining the defined number of turbine generator units, and wherein regulating further comprises regulating, at least to some extent, the water level to a predefinable set point by starting or stopping at least two of the plurality of turbine generator units substantially simultaneously.

43. The method of claim 1, further comprising determining the defined number of turbine generator units based on a current power demand.

44. The method of claim 1, further comprising determining the defined number of turbine generator units based on a future power demand and based upon a future expected power demand.

45. The method of claim 1, further comprising optimizing power generation based on the regulating.

46. The method of claim 1, further comprising optimizing power generation using a mathematical model.

47. The method of claim 1, further comprising determining an optimum number of turbine generator units for power generation using a mathematical model that takes account of at least one of current water inflow, current water outflow, future water inflow, future water outflow, current power demand, and future power demand.

48. The method of claim 47, wherein the mathematical model takes account of at least one of a temporary opening of a weir, a dam, and a sluice.

49. The method of claim 47, wherein the mathematical model takes account of at least one of a temporary closing of a weir, a dam, and a sluice.

50. The method of claim 47, wherein the mathematical model takes account of at least one of a raised position of a turbine generator unit, a raised position of a turbine generator module, inputs from operating personnel, stored empirical values, physical laws, a quantity of water evaporating away, a quantity of water seeping away, current meteorological data, and predictive meteorological data, expected rainfall, and temperature predictions.

51. The method of claim 1, further comprising determining an expected water level of the dam installation for predetermined time period, and setting the predefinable set point based on the expected water level.

52. The method of claim 51, wherein the predetermined time period is one year.

53. The method of claim 1, further comprising determining an expected power demand of the dam installation for predetermined time period, and setting the predefinable set point based on the expected power demand.

54. The method of claim 53, wherein the predetermined time period is one day.

55. The method of claim 1, further comprising raising at least one of the plurality of turbine generator units in order to open a flow cross-section in the dam installation.

56. The method of claim 1, further comprising coupling the dam installation to at least one other dam installation and a central control center, wherein each dam installation is controllable via the central control center.

57. The method of claim 1, further comprising determining the predefinable set point based on at least one of information which unrelated to power generation, navigation considerations, and irrigation considerations.

58. The method of claim 1, wherein the plurality of turbine generator units comprises at least approximately 10 turbine generator units.

59. The method of claim 58, wherein the plurality of turbine generator units comprises between approximately 20 and approximately 500 turbine generator units.

60. A plant for regulating a water level of a dam installation comprising a plurality of turbine generator units arranged at least one of one above another and one beside another, wherein the plurality of turbine generator units are connected to one another and form at least one turbine generator module, the plant comprising:
 a regulating system structured and arranged to start and stop, at least to some extent, at least one of the plurality of turbine generator units; and
 the regulating system maintaining the water level between upper and lower predetermined set points and being configured to adjust, in discrete steps, a quantity of water which can flow through the dam installation,
 wherein a discrete step is defined by a quantity of water which can flow through a defined number of turbine generator units.

61. The plant of claim 60, wherein the dam installation is arranged on a dam.

62. The plant of claim 60, wherein the dam installation comprises a weir.

63. The plant of claim 60, wherein each of the plurality of turbine generator units have an output which is between approximately 100 kW and approximately 1000 kW.

64. The plant of claim 60, wherein the at least one of the plurality of turbine generator units is adapted to operate with one of a substantially constant flow rate and a substantially constant output.

65. The plant of claim 60, wherein the regulating system comprises a device for opening and closing at least one weir system.

66. The plant of claim 60, wherein the dam installation comprises a plurality of piers between which a medium can flow past, and wherein the plurality of turbine generating units are arranged between and supported by two adjacent piers.

67. The plant of claim 60, wherein the regulating system is integrated into at least one of the plurality of turbine generator units.

68. The plant of claim 60, wherein the regulating system is integrated into the at least one turbine generator module.

69. The plant of claim 60, wherein the regulating system is supported on piers of the dam installation.

70. The plant of claim 60, wherein the regulating system is supported directly on piers of the dam installation.

71. The plant of claim 60, wherein the plurality of turbine generator units are capable of being raised and lowered.

72. The plant of claim 60, wherein the at least one turbine generator module is capable of being raised and lowered.

73. The plant of claim 60, further comprising a central control center adapted to regulate the water level of the dam installation.

74. The plant of claim 73, wherein the central control center is adapted to also regulate the water level of another dam installation.

75. The plant of claim 60, wherein the dam installation is arranged on a navigation dam.

76. The plant of claim 60, wherein the dam installation is arranged on a drinking water reservoir.

77. The plant of claim 60, wherein the dam installation is arranged on an irrigation dam.

78. The plant of claim 60, wherein the dam installation is arranged on a flood retention basin.

79. The plant of claim 60, wherein the dam installation comprises a dam stage of a hydroelectric power station.

80. A method of regulating a water level of a dam installation between an upper predetermined set point and a lower predetermined set point, the method comprising:
 starting a number of turbine generator units when the water level reaches the upper predetermined set point;
 stopping a number of turbine generator units when the water level reaches the lower predetermined set point; and
 adjusting the starting and stopping to ensure that the water level is maintained between the upper predetermined set point and the lower predetermined set point,
 wherein the adjusting regulates a quantity of water which can flow through the turbine generator units in discrete steps, and
 wherein a discrete step is defined by a quantity of water which can flow through a defined number of turbine generator units.

81. A system for regulating a water level of a dam installation between an upper predetermined set point and a lower predetermined set point, wherein the dam installation comprises turbine generator units, the system comprising:
 an arrangement for indicating a current water level;
 an arrangement for starting a number of turbine generator units when the water level reaches the upper predetermined set point and for stopping a number of turbine generator units when the water level reaches the lower predetermined set point; and
 an arrangement for adjusting the starting and the stopping to ensure that the water level is maintained between the upper predetermined set point and the lower predetermined set point,
 wherein the arrangement for adjusting the starting and the stopping comprises one of a computer system and an alarm system,
 wherein the system is configured to adjust, in discrete steps, a quantity of water which can flow through the dam installation, and
 wherein a discrete step is defined by a quantity of water which can flow through a defined number of turbine generator units.

* * * * *